July 30, 1957 W. A. SCHULZ 2,800,748
AUTOMATIC TRACER CONTROLS
Filed Feb. 27, 1956 2 Sheets-Sheet 1

INVENTOR
Walter A. Schulz
BY
ATTORNEYS

July 30, 1957  W. A. SCHULZ  2,800,748
AUTOMATIC TRACER CONTROLS
Filed Feb. 27, 1956  2 Sheets-Sheet 2

INVENTOR
Walter A. Schulz
BY
ATTORNEYS

United States Patent Office 2,800,748
Patented July 30, 1957

2,800,748

AUTOMATIC TRACER CONTROLS

Walter A. Schulz, Baltimore, Md., assignor to Franklin Balmar Corporation, a corporation of Delaware Application February 27, 1956, Serial No. 567,835

17 Claims. (Cl. 51—100)

This invention relates to automatic tracer controls adapted especially for use on machine tools, such for example as milling machines, planers, grinders, and the like; and it relates more particularly to the feedback system between the tool assembly which operates upon the workpiece and the tracer assembly which follows a cam or the like and correspondingly controls said tool assembly.

In this art, for a given machining operation, the control of a movement of the tool relative to the workpiece, in at least one plane, may be effected automatically by means of what is known as a tracer, which though it may be electric, is more often hydraulic, and in that form basically includes a valve mechanism operated by a stylus or other member in contact with a cam which is generally movable with the movement of a table or the like which carries the workpiece, and the valve mechanism in turn controls a hydraulic motor, such as a cylinder and piston, which moves the controllable tool assembly or head in a manner bearing a predetermined relation to the cam surface with which said stylus is in contact. In order that the control of the tool should be as nearly exact as possible, the tracer and the hydraulic system through which it moves the tool must be quickly and accurately responsive to the movements of the stylus, and the controlled movement of the tool must in turn similarly effect accurate operation of the tracer mechanism in such manner as to restore it to a predetermined neutral condition, and this is generally done through a continuously-acting followup or feedback system. In the art, various types of feedback systems have been employed, some electrical, some mechanical, and some hydraulic. Regardless of the type, one of the chief problems is to secure an accurate feedback operation, particularly where there is a substantially spaced-apart relation between the tracer and the tool. The principal objective of the present invention is to overcome such difficulties of the prior art, and to secure accurate feedback operation with a minimum of time lag and practically unaffected by disturbing influences, such as vibration, wear of parts, temperature changes, and other factors.

At the same time, the invention contemplates the provision of a simple, efficient and accurate feedback system which is inexpensive and easy to install and to maintain, and which may readily be applied to existing machines, either to replace one of the known feedbacks, or in association with a tracer to render automatic an operation which was previously manual.

In accomplishing the foregoing, the invention further contemplates the use of a simple mechanical system, comprising basically an elongated flexible line or other tension member, such as a steel tape, which is substantially inextensible under the loads imposed, with such member being utilized to transmit motion from a part of the tool assembly to a part of the tracer assembly, by means of a contact element which variably alters the location of at least a portion of the line and a second contact element which is thereby correspondingly altered in its position, while at the same time all slack is kept out of the line, which works in tension in either direction.

More specifically, the invention contemplates a feedback system wherein the motion of the tool in at least one sense, in one plane, causes a corresponding movement of a rolling contact member, which alters the length of a bight in the flexible line, thereby causing corresponding alteration of another bight which is engaged by a second rolling contact member, the latter associated with an element of the tracer assembly. Still further, the invention employs this system in such a manner that the weight of all or part of the tracer assembly is carried in the said second bight of the line so that the line is constantly under a uniform tension proportionate to the weight of the tracer assembly. According to a further feature of the invention, motions of the tool in other planes, although they may alter the space relationship between the tool and the tracer, do not adversely affect the accuracy of the feeding back of the desired motion from the tool to the tracer. Thus, the feedback system may be utilized to transmit a vertical tool motion to the tracer, while at the same time, a horizontal movement of the tool, for instance toward or away from the tracer, will have no effect thereon.

Still further, the combined assemblies of tracer mechanism and tool mechanism, together with the feedback system, may be so mounted on the machine that they may be moved vertically and/or horizontally as a unit, without disturbing the feedback adjustment or functioning. Also, either the tracer assembly or the tool assembly may be shifted on the machine to various positions (each independently of the other), to suit the application of various workpieces, guide cams, work-holding chucks, etc., and in these cases the feedback system can be correspondingly adjusted initially. The use of the system is thus very flexible.

How the foregoing objectives and advantages of the invention are obtained will be clear from the following description and the accompanying drawings which disclose the present preferred embodiment of the invention as applied to a planing machine which has been adapted, through the intermediation of the invention, to perform an automatic surface milling operation.

Figure 1:
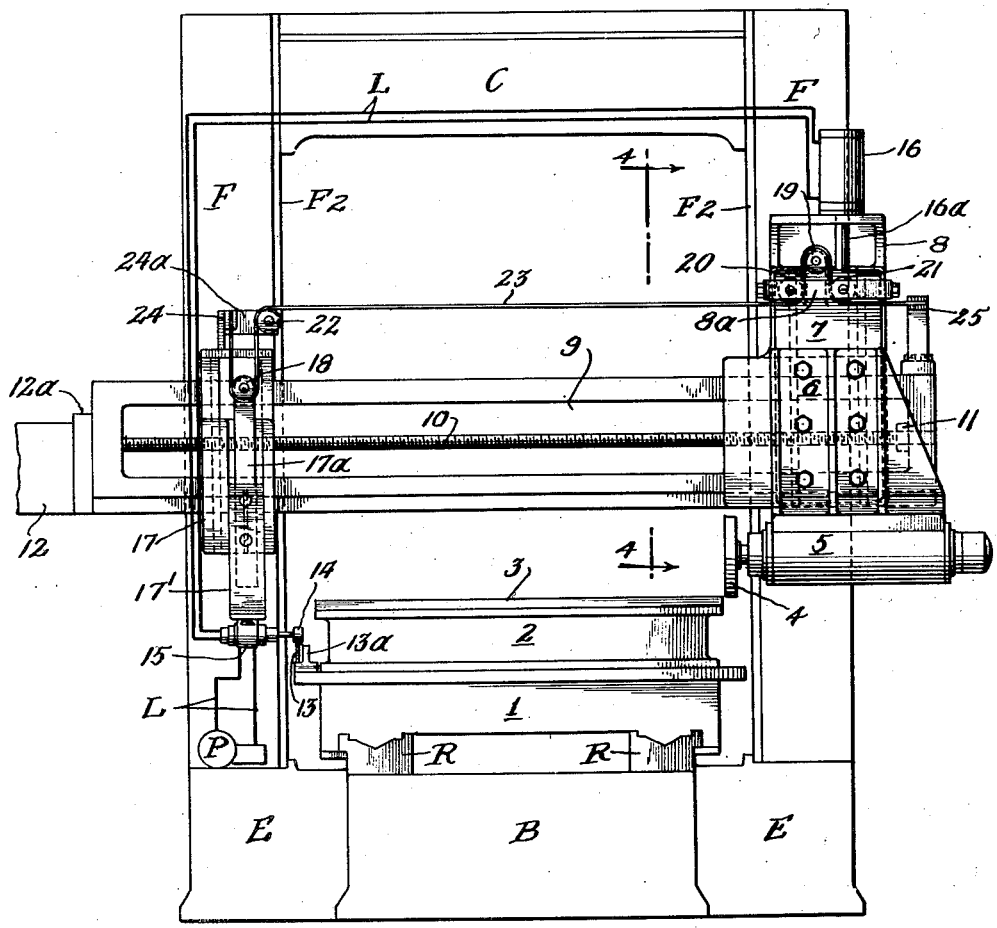
Figure 1 is an end elevational view of a planer which has been modified to do a surface milling operation, illustrating an application of the present invention in its preferred embodiment.

The machine in general comprises an elongated base or bed B having side extensions E and vertical frame members F, which at the top are interconnected by the crossbrace C.

Along the tracks or rails R is movable the table 1, on which is mounted, in this instance, a chuck or other work holder 2, carrying the workpiece 3, which is here shown as a plate, which is secured on the chuck in any suitable manner, in position to be milled by a rotating milling cutter which in this instance takes the form of a grinding wheel 4, driven by motor 5, which in turn is mounted by a bracket 6 upon a slide 7, which is vertically slidable on a siddle member 8, which in turn is slidable horizontally on the flanged crossrail structure 9. The transverse movement of the tool assembly 4, 5, 6, 7 and 8 and other parts yet to be described, is effected by means of the threaded rod 10 which turns within the nut structure 11 of the saddle member 8; the rod 10 being rotatable by controllable motor 12, through reducing gears in the casing 12a mounted on one end of the crossrail structure 9. The latter structure, with the associated parts, is in turn mounted for vertical adjustment on the rails or guideways F1 and F2 of the vertical frame members F.

Having once set the vertical height adjustment of the crossrail 9, to suit the particular chuck and workpiece upon which the tool 4 is to operate, the actual operating movements of the tool take place relative to the crossrail structure, i. e., the tool may be moved transversely of the machine, by rotation of the threaded rod 10, and vertically with relation to the workpiece, by the vertical movement of slide 7 on saddle 8. Relative movement between tool and workpiece in a direction longitudinally of the machine, is effected by controlled movement of the table 1 on the rails R.

The profile or depth of the cut of the rotating tool 4 is determined by the tracer control, now to be described.

Figure 2:
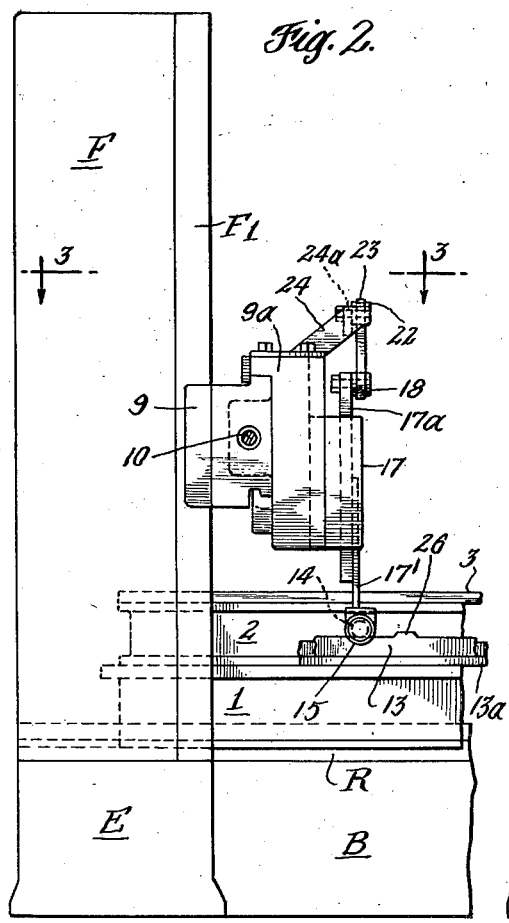
Figure 2 is a fragmentary side elevational view of the machine viewed from the left of Figure 1.
Figure 4:
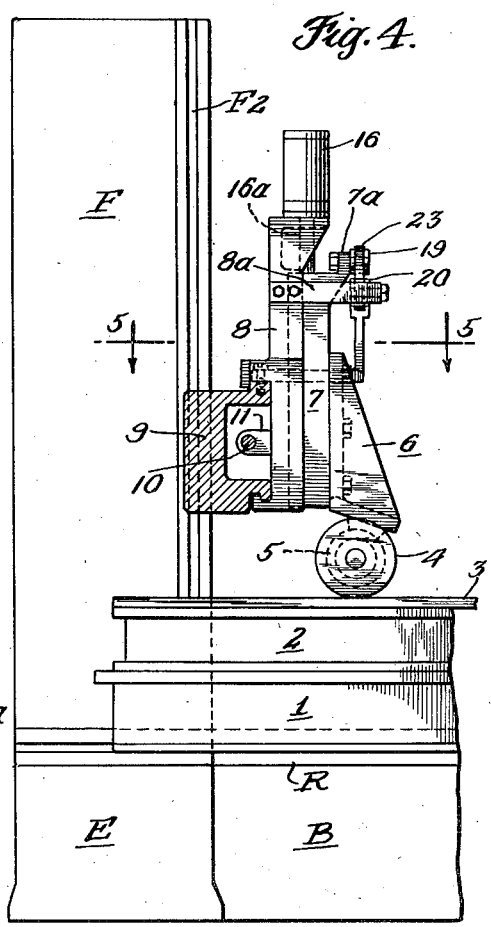
Figure 4 is a vertical section on the line 4—4 of Figure 1, with the planer table appearing in elevation and with the upper crossbrace of the machine omitted.
Figure 3:
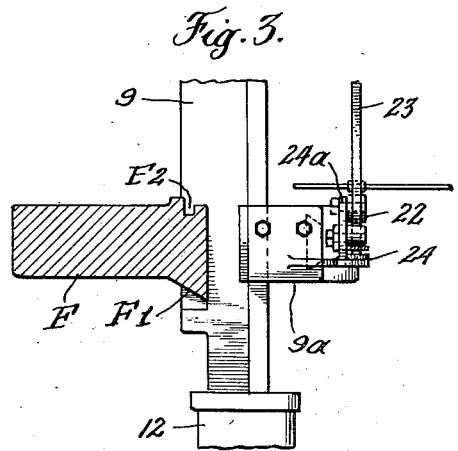
Figure 3 is a plan section on the line 3—3 of Figure 2.
Figure 5:
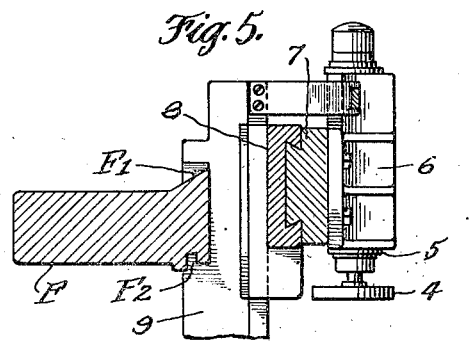
Figure 5 is a plan section on the line 5—5 of Figure 4.

A pattern, such as a cam 13, may be used to progressively and variably regulate the depth of cut of the tool 4 as it progresses over the workpiece 3 along a path which is the resultant of the longitudinal movement of the table 1 and the transverse movement of the tool assembly. The cam 13 (which as shown in Figure 2 has a variation in profile in the vertical sense, to effect such changes in depth of cut by the tool) may be mounted on the table 1 by any suitable cam holder 13a.

The cam is engaged by the stylus or head 14 of the tracer assembly, which in this instance includes a hydraulic tracer 15 of any suitable known type (one such type being the "True-Trace"), which is connected by oil pipes L to the pump P with its sump, and to the hydraulic cylinder 16, which is fixedly mounted on saddle 8, the piston rod 16a extending downwardly from said cylinder being fixed to the slide member 7 so as to move the tool assembly vertically.

The housing of tracer 15, which encloses the usual valves and other parts of the tracer control mechanism, is fixed to a tracer slide 17 which moves vertically in the rails or guideways formed in the tracer saddle 9a, which in turn is fixed upon the crossrail structure 9. A bracket 17' mounts the tracer 15 on the slide. An upper extension 17a adjustably mounted on the tracer slide 17, but normally fixed to move therewith, carries a line-contacting element in the form of a roller 18 which rides in a bight in the line 23, whose ends are fixed respectively to brackets 24 and 25—bracket 24 being fixedly secured to the upper end of saddle 9a, and bracket 25 being fixedly secured to the crossrail structure 9. Brackets 24 and 25 thus serve as tape-end anchors.

Additional rollers 19, 20, 21 and 22 engage the line 23, which in this instance is a thin flexible steel tape. Roller 19 is mounted on upper extension 7a of the vertical slide 7 for the tool, so that its center moves vertically with the tool slide, just as roller 18 is mounted on the upper extension 17a of the tracer slide 17 so as to move vertically therewith. Rollers 20 and 21 are mounted at fixed centers on yoke 8a fastened to the saddle 8, and roller 22 is mounted at a fixed center by an extended arm 24a of the bracket 24, which in turn is fixed by the saddle 9a to the crossrail structure 9.

The vertical location of the centers of the rollers 20, 21 and 22, and also of the tape-end anchor 25, should be such that the transverse run of the tape 23 in contact with said rollers is parallel with the transverse traverse of the tool assembly, which in this instance is horizontal. With the roller 19 disposed above this horizontal plane and the roller 18 disposed therebelow, it will be seen that each of said rollers rides in a bight of the line 23. Any vertical movement of the slide 7 carrying the tool 4 will correspondingly raise or lower the roller 19 relative to the rollers 20 and 21, and thus alter the vertical extent of the associated bight of the line 23. When said bight is lengthened by upward movement of slide 7, the other bight, in which roller 18 rides, will be correspondingly shortened. Thus, the controlled vertical movements of the tool will be fed back to the tracer assembly, which will be moved in unison therewith.

Movements of the tool assembly in a transverse sense will, on the other hand, have no effect upon the tracer position, for in the transverse direction the group or cluster of rollers 19, 20 and 21 will move in unison, transversely, with the tool, without altering the length of the associated bight in the line.

From the foregoing it will be quite clear that as the table 1 moves longitudinally of the machine (whether or not the control of the tool at the same time calls for movement of the tool assembly transversely of the machine), the stylus or head 14 will ride along the profile of the cam 13. In the example shown, as the head 14 rides up onto the cam hump 26, it operates the valve mechanism in the tracer device 15 in such manner as to actuate, through the hydraulic lines, the piston in cylinder 16, to correspondingly raise the tool assembly at the opposite side of the machine from the tracer. In order that the tool assembly should accurately follow the intended vertical motions determined by the cam profile, the vertical movement of the tool must be fed back to the housing of the tracer device 15, so as to constantly tend to return the controls therein to their neutral position. It will now be seen that this is done automatically and accurately, without appreciable time lag, through the tape-type feedback system above described. It will be understood that the tautness of the tape, and the accuracy of the relationship between the tool assembly and the tracer assembly, are always assured by the fact that the tracer assembly hangs by gravity upon the bight of the line in which rides the roller 18. Thus, raising or lowering of roller 19 in association with the tool assembly, correspondingly raises and lowers the roller 18 and thus the tracer assembly.

Once the various fixed adjustments of the two assemblies, vertically and horizontally are made, to suit the particular chuck, workpiece, tool, cam, etc., when the machine is being set up for an operation, there can be no maladjustment of the feedback, such as sometimes occurs in other feedback systems; there can be no disturbance due to lost motion or vibration, since slack in the line is prevented by the mode of engagement of the rollers with the tape and the slinging of the slide of the tracer assembly in a bight of the line; and there can be no appreciable detrimental effect from temperature changes in the ambient air, since such changes will affect the transverse dimension of the steel framing C and crossrail 9 to an extent similar to the effect of such changes upon the length of the tape 23 which is largely a horizontal run, not differing appreciably in length from the length of the structures C and 9.

From the foregoing, it will be obvious how the objectives set out earlier in the specification are achieved by the typical preferred embodiment of the invention herein disclosed.

In the embodiment illustrated, the machine is basically a planing machine which has been adapted for a surface or "skin" milling operation upon an aluminum slab 3, to form therefrom a large segment of an airplane wing, having different portions cut out to varying depths, of fine graduation; the varying depth at different portions of the surface area being smoothly, accurately and automatically controlled by the tracer control in conjunction with the feedback system of the present invention. The invention is readily adapted to installation in new machines and substantially equally adapted for use in converting existing manually-controlled machines to automatic control, or converting machines for one purpose to a different purpose.

In general, it should be emphasized that however large the machine, whatever the uses to which it may be put, and whatever may be the distances through which the tool assembly travels relative to (or toward and away from) the tracer head and/or the cam, the particular action of the tool which is effected by the tracer head and is to be fed back to the tracer is always accurately and smoothly fed back, without interference from and without interfering with other motions of the tool, as well as other parts of the machine and their operations.

I claim:

1. In a machine having a controllably movable tool assembly for operating upon a workpiece and, separated therefrom, a tracer assembly of a feedback follow-up type with a head adapted to follow a pattern and to effect corresponding movement of the tool, a tracer feedback system comprising an elongated flexible line member substantially inextensible under the loads imposed and adapted to act in tension between said assemblies, an element movable with a controlled movement of the tool and cooperating with said line to accordingly transmit movement to at least a portion thereof, and a second element associated with said line to receive such movement therefrom and operatively connected with said tracer assembly to accordingly cause a follow-up movement of the tracer.

2. A tracer feedback system according to claim 1, wherein there are means fixing the ends of said flexible line member, the specified element operatively connected with said tracer assembly comprises a contact element riding a bight in said line, and the specified element movable with the tool comprises a contact element riding a second bight in said line, the latter element being mounted to move in said line with movements of said tool as effected by the tracer head, in a direction to vary the length of said second bight, and thus through said line to effect variations of the bight in which said tracer contact element rides whereby to cause the said follow-up movement of the tracer.

3. In a machine in accordance with claim 2, wherein said tool is mounted for movement in at least two senses at angles to each other, a tracer feedback system as therein set forth, wherein the tool has a plurality of contact elements riding said line, one of said plurality of elements being movably mounted to form a variable bight in said line with movements of said tool in a first sense as effected by the tracer head whereby variations of the latter bight effect variations of the bight in which said tracer contact element rides and thus cause the follow-up movement of the tracer, said plurality of elements being movable simultaneously as a group along said line with movements of said tool in a second sense without thereby altering either bight in said line.

4. A tracer feedback system according to claim 3, wherein said contact elements are of a rolling type, and wherein the said plurality of contact elements associated with said tool includes a pair of rolling elements mounted on axes normally fixed as against movement with the tool in said first sense, but movable with said tool in said second sense.

5. A tracer feedback system according to claim 3, wherein a pair of said plurality of contact elements associated with said tool are located in a common plane, and wherein another contact element is disposed as a fixed point adjacent the first-mentioned bight in said line and in such relation to said pair of elements as to establish a general plane for said line which is parallel to the movements of said tool in its said second sense.

6. The tracer feedback system of claim 5, wherein the specified plane of the line and the last-mentioned plane of tool movement extend horizontally.

7. The tracer feedback system of claim 6, wherein the horizontal movement of the tool is transversely of the machine.

8. The tracer feedback system of claim 7, wherein the tool is a rotating tool and said machine includes means whereby a controlled relative movement may be effected between the tool and the workpiece in a direction longitudinally of the machine.

9. The tracer feedback system of claim 8, wherein the relative longitudinal movement is effected by longitudinal movement of the workpiece, and the pattern to be followed by the tracer head is mounted to move longitudinally with the workpiece.

10. The tracer feedback system of claim 3, wherein said line is of a flexible tape type and the contact elements are shaped as rollers having surface contact with the tape.

11. The tracer feedback system of claim 3, wherein the flexible line member extends generally horizontally, the axis of each bight in the line is generally vertical, and a normally fixed contact element and a first tape-end anchor determine the open end of the first-mentioned bight, a pair of said group of elements determine the open end of the second-mentioned bight, and a second tape-end anchor cooperates with said normally fixed contact element and with said pair of elements in determining the general plane of said line member.

12. The tracer feedback system of claim 3, wherein the flexible line member extends generally horizontally, the axis of each bight in the line is generally vertical, and a normally fixed contact element and a first tape-end anchor determine the open end of the first-mentioned bight, a pair of said group of elements determine the open end of the second-mentioned bight, and a second tape-end anchor cooperates with said normally fixed contact element and with said pair of elements in determining the general plane of said line member, wherein the tracer assembly hangs by gravity in the first-mentioned bight, and the second-mentioned bight extends vertically upwardly from the general plane of said line.

13. In a machine having a tracer feedback system according to claim 12, in combination with said system a horizontal crossrail along which the tool assembly is controllably movable, both of said tape-end anchors being normally fixed with relation to said crossrail.

14. The machine of claim 13, having means for vertically adjusting said crossrail to different fixed positions.

15. The machine of claim 14, having separate vertical guideways for the tracer assembly and the feedback assembly.

16. In a machine having a tracer feedback system according to claim 1, in combination with said system a movable mounting for the tool assembly whereby said assembly when in operation moves substantial distances from said tracer, and said flexible line member is similarly extended.

17. The machine of claim 16, wherein a hydraulic system interconnects the tracer and the tool to effect the movement of the tool corresponding to the movement of the tracer head along the pattern.

References Cited in the file of this patent

UNITED STATES PATENTS 2,207,830     Shaw _____ July 16, 1940